United States Patent
Devireddy et al.

(10) Patent No.: US 11,064,020 B2
(45) Date of Patent: Jul. 13, 2021

(54) CONNECTION LOAD DISTRIBUTION IN DISTRIBUTED OBJECT STORAGE SYSTEMS

(71) Applicant: Western Digital Technologies, Inc., San Jose, CA (US)

(72) Inventors: Kishore Kumar Reddy Devireddy, San Jose, CA (US); Ken Williams, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 16/451,402

(22) Filed: Jun. 25, 2019

(65) Prior Publication Data
US 2020/0412798 A1 Dec. 31, 2020

(51) Int. Cl.
*H04L 29/08* (2006.01)
*G06F 3/06* (2006.01)
*H04L 29/06* (2006.01)

(52) U.S. Cl.
CPC ........ *H04L 67/1008* (2013.01); *G06F 3/0635* (2013.01); *G06F 3/0683* (2013.01);
(Continued)

(58) Field of Classification Search
CPC .... G06F 3/0601; G06F 3/0602; G06F 3/0635; G06F 3/0653; G06F 3/067; G06F 3/0683;
(Continued)

(56) References Cited

U.S. PATENT DOCUMENTS 7,877,490 B1 * 1/2011 Talagala ................ H04L 67/148
709/227
9,294,558 B1 * 3/2016 Vincent ............... H04L 67/1004
(Continued)

FOREIGN PATENT DOCUMENTS

CN 105264865 A 1/2016
WO 2007014296 A2 2/2007

OTHER PUBLICATIONS

Langley, Adam, et al. "The QUIC Transport Protocol: Design and Internet-Scale Deployment." Proceedings of the Conference of the ACM Special Interest Group on Data Communication. Aug. 21-25, 2017. pp. 183-196 (Year: 2017).*
(Continued)

*Primary Examiner* — Atta Khan
*Assistant Examiner* — William C McBeth
(74) *Attorney, Agent, or Firm* — Patent Law Works LLP

(57) ABSTRACT

An example system comprises a first access node in a first rack configured to engage in a connection with a client, and a second access node in a second rack. The first and second racks form a multi-rack distributed storage system. The system includes a distributed database including a first load indicator designating a first processing load of the first access node and a second load indicator designating a second processing load of the second access node. The distributed database is accessible to the first and second access nodes. The system further includes a connection relocation manager configured to relocate the connection with the client from the first access node to the second access node when the second processing load is less than the first processing load.

16 Claims, 9 Drawing Sheets

(52) U.S. Cl.
CPC ........ *H04L 67/1097* (2013.01); *H04L 67/146* (2013.01); *H04L 67/148* (2013.01); *H04L 69/164* (2013.01); *G06F 3/067* (2013.01)

(58) Field of Classification Search
CPC .. G06F 3/0689; G06F 16/182; G06F 16/1824; G06F 16/1827; G06F 16/183; G06F 3/061; H04L 67/1004; H04L 67/1008; H04L 67/1029; H04L 67/1097; H04L 67/146; H04L 67/148; H04L 67/2814
See application file for complete search history.

(56) References Cited

U.S. PATENT DOCUMENTS

| | | | | |
|---|---|---|---|---|
| 9,338,192 | B1* | 5/2016 | He | H04L 69/165 |
| 10,346,367 | B1* | 7/2019 | Luszcz | H04L 67/1008 |
| 2007/0022121 | A1* | 1/2007 | Bahar | H04L 67/1008 |
| 2009/0059862 | A1 | 3/2009 | Talagala et al. | |
| 2012/0072540 | A1* | 3/2012 | Matsuzawa | G06F 16/182 |
| | | | | 709/219 |
| 2013/0198250 | A1 | 8/2013 | Iwamatsu et al. | |
| 2017/0171305 | A1* | 6/2017 | Jones | H04L 67/1029 |
| 2018/0337991 | A1 | 11/2018 | Kumar et al. | |
| 2019/0104207 | A1 | 4/2019 | Goel et al. | |
| 2019/0208554 | A1* | 7/2019 | Ruiz | H04L 69/164 |

OTHER PUBLICATIONS

WO 2018/024344 A1, Feb. 2018, Mihaly et al., WIPO (Year: 2018).*
Lu, Yilin, et al. "A hybrid dynamic load balancing approach for cloud storage." 2012 International Conference on Industrial Control and Electronics Engineering. IEEE, 2012. (Year: 2012).*
Chatzieleftheriou, A. et al., Larry: Practical Network Reconfigurability in the Data Center, 2018, p. 1-16, Microsoft Research, https://www.microsoft.com/en-us/research/uploads/prod/2018/04/nsdi18-Larry.pdf.
Mahapatra, S. et al., Load Balancing Mechanisms in Data Center Networks, Jan. 2010, p. 1-6, Department of Computer Science, Florida State University, Tallahassee, USA.
Singh, A. et al., Server-Storage Virtualization: Integration and Load Balancing in Data Centers, IEEE Conference on Supercomputing, p. 1-12, Austin, Texas, USA.
International Search Report and Written Opinion of Application No. PCT/US2020/019770, dated Sep. 7, 2020 (10 pages).

* cited by examiner

CONNECTION LOAD DISTRIBUTION IN DISTRIBUTED OBJECT STORAGE SYSTEMS

TECHNICAL FIELD

The present disclosure generally relates to data storage, and in a more particular example, to distributed data storage systems.

BACKGROUND

Often, distributed storage systems are used to store large amounts (e.g., terabytes, petabytes, exabytes, etc.) of data, such as objects or files in a distributed and fault tolerant manner with a predetermined level of redundancy.

Some existing object storage systems store object data referenced by an object identifier versus file systems. This can generally allow object storage systems to surpass the maximum limits for storage capacity of file systems in a flexible way such that, for example, storage capacity can be added or removed as a function of the applications, systems, and/or enterprise needs, while reducing degradation in performance as the system grows. As a result, object storage systems are often selected for large-scale storage systems.

Large-scale storage systems generally receive connection requests in an ad hoc manner without regard to existing loading of access nodes. Servicing each connection can tax the processing and storage capability of an access node. When an access node is highly loaded, a subsequent connection request to that access node may result in a dropped connection or a denial of service. Accordingly, preventing such overloading of an access node provides improved network operability.

SUMMARY

Various aspects for connection load distribution in distributed object storage systems.

One general aspect includes a system that includes a first access node in a first rack. The first access node is configured to engage in a connection with a client. The system includes a second access node in a second rack. The first and second racks form multi-rack distributed storage system. The system includes a distributed database including a first load indicator designating a first processing load of the first access node and a second load indicator designating a second processing load of the second access node. The distributed database is accessible to the first and second access nodes. The system includes a connection relocation manager configured to relocate the connection with the client from the first access node to the second access node when the second processing load is less than the first processing load.

One general aspect includes a computer-implemented method including: receiving a first request at a first access node in a first rack from a client over a connection; accessing a connection load distributed database including a first load indicator designating a first processing load of the first access node and a second load indicator designating a second processing load of a second access node, where the first and second access nodes form a multi-rack distributed storage system and the connection load distributed database being accessible to the first and second access nodes; and relocating the connection with the client from the first access node to the second access node when the second processing load is less than the first processing load.

Another general aspect includes a system including: means for receiving a first request at a first access node in a first rack from a client over a connection; means for accessing a connection load distributed database including a first load indicator designating a first processing load of the first access node and a second load indicator designating a second processing load of a second access node, where the first and second access nodes form a multi-rack distributed storage system and the connection load distributed database being accessible to the first and second access nodes; and means for relocating the connection with the client from the first access node to the second access node when the second processing load is less than the first processing load.

Implementation may include one or more of the following features: that the second access node is further configured to update the second processing load in the connection load distributed database based on an additional load of the connection; a storage node in the second rack; that the second access node is further configured to process a first request received at the first access node from the client over the connection; that the first request is for an interaction with the storage node; the second access node is configured to send a response to the client over the connection between the second access node and the client; the response is based on the first request from the client received over the connection between the first access node and the client; the second rack is remotely located from the first rack; the connection relocation manager is further configured to relocate the connection when the first processing load exceeds a loading threshold and the second processing load is less than the first processing load; the connection with the client is identified by a connection ID that is independent of a source IP address and a destination IP address of the first access node and a source IP address and a destination IP address of the client; the connection relocation manager in the first access node is further configured to send the connection ID and details of a type of the connection to the second access node; the connection relocation manager in the second access node is further configured to send a second request using the connection ID to the client, wherein the second request includes a destination address of the second access node, and maintain the connection with the client; the connection is based on a Quick User datagram protocol (UDP) Internet Connection (QUIC) protocol; updating the second processing load in the connection load distributed database based on an additional load of the connection; processing by the second access node the first request received at the first access node from the client over the connection, the first request for an interaction with a storage node in the multi-rack distributed storage system; sending a response to the client over the connection between the second access node and the client; that the response is based the first request from the client received over the connection between the first access node and the client; relocating the connection when the first processing load exceeds a loading threshold and the second processing load is less than the first processing load; connection with the client is identified by a connection ID that is independent of source and destination IP addresses of the first access node and the client; sending a second request from the second access node using the connection ID to the client, the second request including a destination address of the second access node; and maintaining the connection with the client.

The various embodiments advantageously apply the teachings of distributed storage networks and/or systems to provide for distributing the load in a single or multi-rack object storage system by relocating the connection end point. The various embodiments include operations to distribute a load associated with a new connection to a lesser or least loaded access node in the multi-rack distributed storage system. That is, the various embodiments disclosed herein include hardware and/or software with functionality to improve the relocation (e.g., migration) of connections that include client requests for writing or reading object data in a multi-rack distributed object storage system. Object storage systems provide multiple front-end servers for serving the client requests. Clients can access the front-end servers in any random fashion but the clients have no way to control or influence the clients to distribute the load across all the front-end servers or racks. The various disclosed embodiments provide such a solution. Accordingly, the various embodiments disclosed herein provide various improvements to storage operations and storage systems to overcome or at least reduce the issues in the previous storage networks and/or systems discussed above and, accordingly, may be more reliable and/or efficient than other computing networks.

Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Methods and apparatus are provided for distributing a load in a single or multi-rack object storage system by relocating the connection end point. Object storage systems provide multiple front-end servers for serving the client requests. Clients can access the front-end servers in any random manner resulting in a lack of distribution of the processing load related to the connection across the front-end servers or racks since the client does not know about the individual loading of each access node before selecting an access node and sending a request. In some prior approaches, the somewhat randomly selected access node that received the request, could respond by either processing the request and incurring the additional load or dropping the request if the access node was overloaded.

In the embodiments described herein, the connection that provided the request to the access node may be relocated to a lesser loaded access node that may be more capable of processing the request. The relocation may be performed by using a connection-oriented protocol which is designed with connection end point relocation capability.

Figure 1:
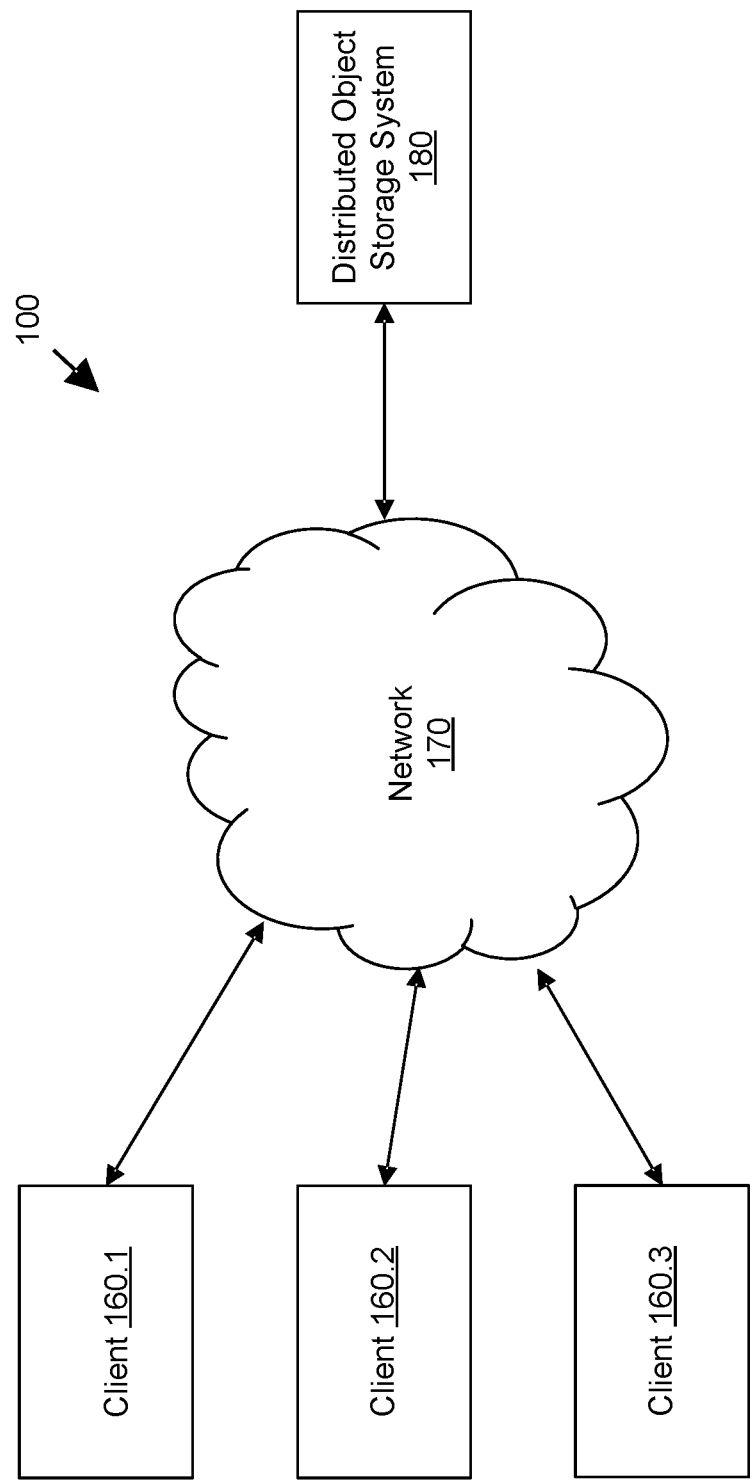
FIG. 1 is a block diagram of an example storage network using a client architecture.

FIG. 1 is a block diagram of an example storage network 100 using a client architecture. In some embodiments, the storage network 100 includes a multi-rack object storage system 180 and may include multiple client devices 160 capable of being coupled to and in communication with a storage network 100 via a wired and/or a wireless network 170 (e.g., public and/or private computer networks in any number and/or configuration (e.g., the Internet, an intranet, a cloud network, etc.)), among other examples that may include one client device 160.1 or two or more client devices 160 (e.g., is not limited to three client devices 160.1-160.3).

A client device 160 can be any computing hardware and/or software (e.g., a thick client, a thin client, or hybrid thereof) capable of accessing the distributed object storage system 180 utilizing network 170. Each client device 160, as part of its respective operation, relies on sending input/output (I/O) requests to the multi-rack object storage system 180 to write data, read data, and/or modify data. Specifically, each client device 160 can transmit I/O requests to read, write, store, communicate, propagate, and/or transport instructions, data, computer programs, software, code, routines, etc., to the multi-rack object storage system 180.

Client device(s) 160 and storage system 180 may comprise at least a portion of a client-server model. In general, the multi-rack object storage system 180 may be accessed by client device(s) 160 and/or communication with the multi-rack object storage system 180 may be initiated by client device(s) 160 through a network socket (not shown) utilizing one or more inter-process networking techniques. In some embodiments, client devices 160 may access one or more applications to use or manage a distributed storage system, such as distributed storage object system 180.

Figure 2:
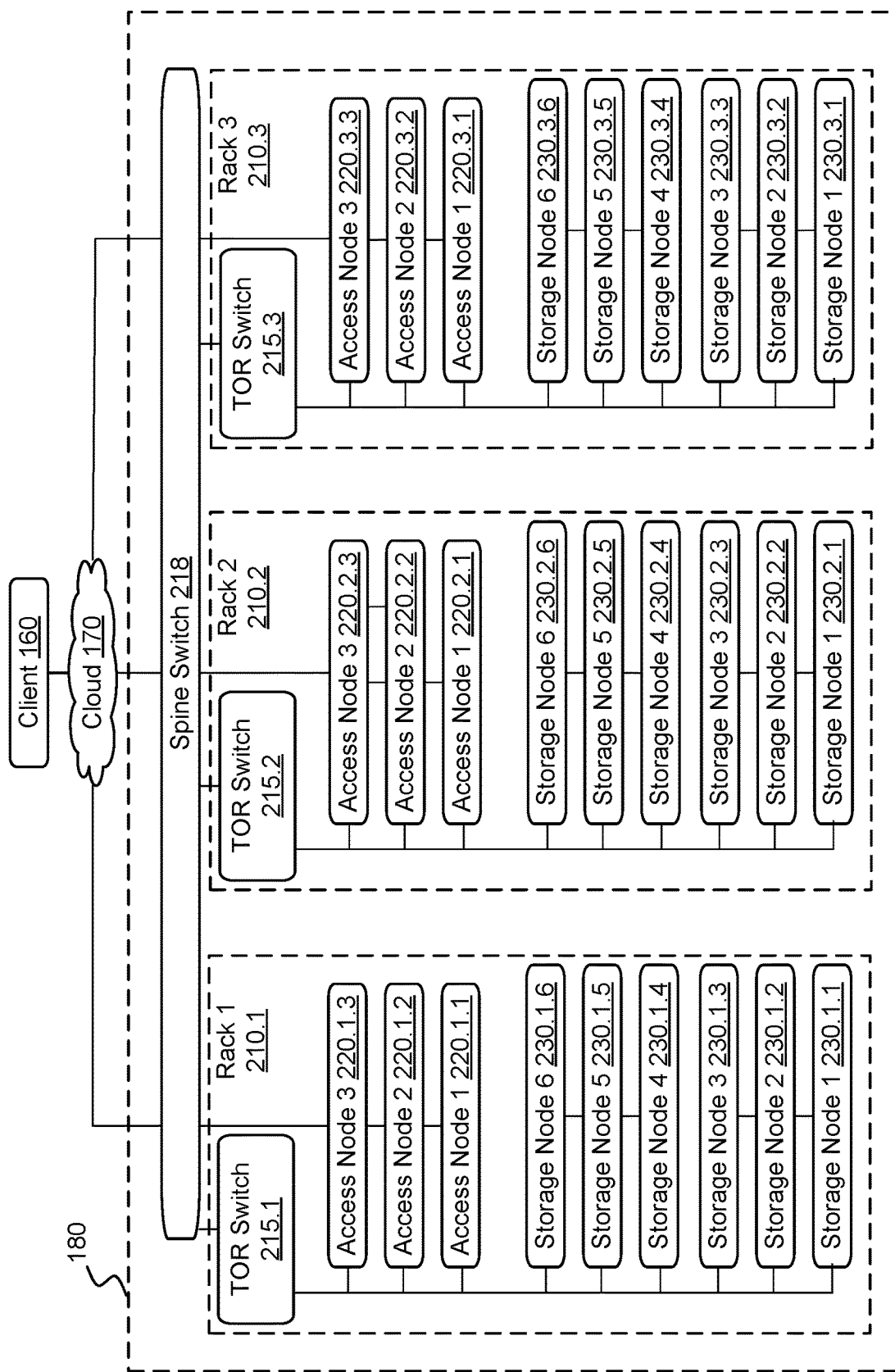
FIG. 2 shows an embodiment of an example multi-rack object storage system.

FIG. 2 shows an embodiment of an example multi-rack object storage system 180. According to this embodiment, the multi-rack object storage system 180 may be implemented as a distributed object storage system which may be coupled to one or more clients 160 for accessing object data. The connection between the multi-rack object storage system 180 and clients 160 could, for example, be implemented as a suitable data communication network 170. Clients 160 may host or interface with one or more applications that use data stored in multi-rack object storage system 180. Such an application could, for example, be a dedicated software application running on a client computing device, such as a personal computer, a laptop, a wireless telephone, a personal digital assistant, or any other type of communication device that is able to interface directly with the multi-rack object storage system 180. However, according to alternative embodiments, the applications could, for example, comprise a suitable file system which enables a general-purpose software application to interface with the multi-rack object storage system 180, an application programming interface (API) library for the multi-rack object storage system 180, etc.

Clients 160 may include computing devices and/or systems running applications compatible with one or more file systems that manage data and data access through files, directories, volumes, devices, and/or similar logical structures for mapping data units to physical storage locations. For example, clients 160 may include file system clients configured with a file system protocol, such as the network file system (NFS) protocols, server message block (SMB) protocols, file allocation table (FAT) protocols, Hadoop distributed file system (HDFS) protocols, Google file system (GFS) protocols, etc.

As further shown in FIG. 2, the multi-rack object storage system 180 may be configured as a multi-rack distributed object storage system including a plurality of racks 210. The multi-rack configuration illustrated in FIG. 2 includes a first rack 210.1, a second rack 210.2, and a third rack 210.3. The quantity of racks in FIG. 2 is illustrative and is not to be considered limiting of any configuration of the multi-rack object storage system 180. Each of the plurality of racks 210 may include one or more top-of-rack (TOR) switches 215, each of which couple to a spine switch 218 in the multi-rack object storage system 180. The spine switch 218 provides an interface for the multi-rack object storage system 180 with the network 170.

Each of the racks 210 comprises a plurality of access node 220.x.1-220.x.n and a plurality of storage nodes 230.x.1-230.x.m (where "x" is the rack number) which may be coupled in a suitable way for transferring data, for example via a suitable data communication network such as a local area network (LAN), a wide area network (WAN), a telephone network, such as the public switched telephone network (PSTN), an intranet, the internet, or any other suitable communication network or combination of communication networks. By way of example and not limitation, each rack 210 in FIG. 2 illustrates three access nodes (220.x.1-220.x.3) and six storage nodes (230.x.1-230.x.6).

Access nodes 220, storage nodes 230 and the computing devices comprising clients 160 may connect to the data communication network 170 by means of suitable wired, wireless, optical, etc. network connections or any suitable combination of such network connections. Although the embodiment of FIG. 2 shows only nine access nodes 220 and eighteen storage nodes 230, according to alternative embodiments the multi-rack object storage system 180 could comprise any other suitable number of storage nodes 230 and access nodes 220.

Access nodes 220 and storage nodes 230 may be built as general-purpose computers, however more frequently they are physically adapted for arrangement in large data centers, where they are arranged in modular racks 210.1-210.n comprising standard dimensions. Exemplary access nodes 220 and storage nodes 230 may be dimensioned to take up a single unit of such racks 210, which may be generally referred to as 1U. Such an exemplary storage node may use a low-power processor and may be equipped with ten or twelve high capacity serial advanced technology attachment (SATA) disk drives and is connectable to the network over redundant Ethernet network interfaces.

An exemplary access node 220 may comprise high-performance servers and provide network access to clients 160 over multiple high bandwidth Ethernet network interfaces. Data can be transferred between clients 160 and such access nodes 220 by means of a variety of network protocols including hypertext transfer protocol (HTTP)/representational state transfer (REST) object interfaces, HTTP/2, language-specific interfaces such as Microsoft .Net, Python or C, etc. Additionally, such access nodes may comprise additional high bandwidth Ethernet ports to interface with the storage nodes 230. In some embodiments, HTTP/REST protocols complying with S3 may enable data transfer through a REST application protocol interfaces (API). Such access nodes 220 may operate as a highly available cluster of controller nodes with one or more integrated and/or independent interface systems, and provide for example shared access to the storage nodes 230, metadata caching, protection of metadata, etc.

As shown in FIG. 2, several storage nodes 230 can be grouped together, for example, because they are housed in a single rack 210. For example, storage nodes 230.1.1-230.1.6, 230.2.1-230.2.6, and 230.3.1-230.3.6 are respectively grouped into racks 210.1, 210.2, and 210.3. Access nodes 220 may be located in the same or different racks as the storage nodes to which the access nodes connect.

Figure 3:
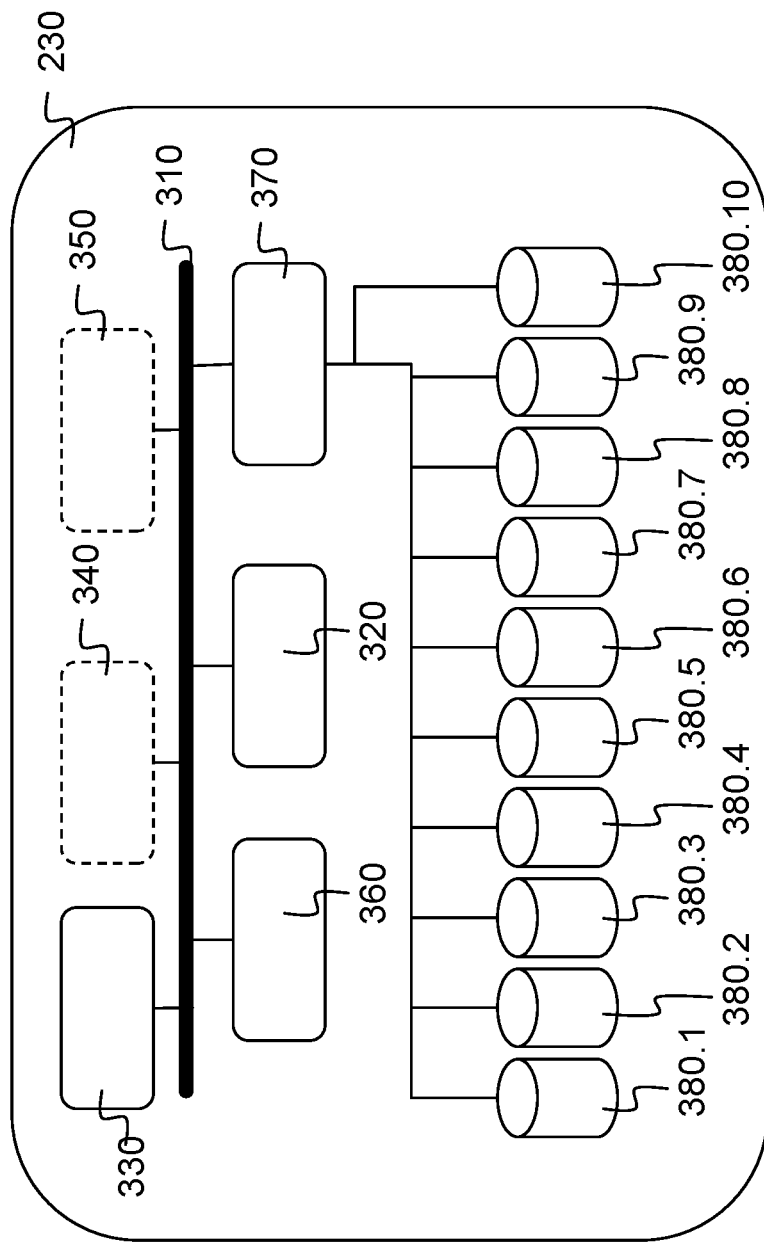
FIG. 3 shows a schematic representation of an embodiment of one of the storage nodes.

FIG. 3 shows a schematic representation of an embodiment of one of the storage nodes 230. Storage node 230 may comprise a bus 310, a processor 320, a local memory 330, one or more optional input units 340, one or more optional output units 350, a communication interface 360, a storage element interface 370, and two or more storage elements 380.1-380.10. Bus 310 may include one or more conductors that permit communication among the components of storage node 230.

Processor 320 may include any suitable type of processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320.

Input unit 340 may include one or more suitable mechanisms that permit an operator to input information to the storage node 230, such as a keyboard, a mouse, a pen, voice recognition and/or biometric mechanisms, etc. Output unit 350 may include one or more suitable mechanisms that output information to the operator, such as a display, a printer, a speaker, etc. Communication interface 360 may include any transceiver-like mechanism that enables storage node 230 to communicate with other devices and/or systems, for example mechanisms for communicating with other storage nodes 230 or access nodes 220 such as for example two 1 gigabit (Gb) Ethernet interfaces.

Storage element interface 370 may comprise a storage interface such as for example a SATA interface or a small computer system interface (SCSI) for connecting bus 310 to one or more storage elements 300, such as one or more local disks, for example 3 terabyte (TB) SATA disk drives, and control the reading and writing of data to/from these storage elements 300. In one exemplary embodiment as shown in FIG. 1, such a storage node 230 could comprise ten or twelve 3 TB SATA disk drives as storage elements 380.1-380.10 and in this way storage node 230 would provide a storage capacity of 30 TB or 36 TB to the multi-rack object storage system 180. According to the exemplary embodiment of FIG. 2 and in the event that the various storage nodes 230 are identical and each comprise, for example, a storage capacity of 36 TB, the multi-rack object storage system 180 would then have a total storage capacity of 1440 TB.

As is clear from FIGS. 2 and 3, the distributed object storage system 180 comprises a plurality of storage elements 380. As will be described in further detail below, the storage elements 380, could also be referred to as redundant storage elements 380 as the data is stored on these storage elements 380 such that none or a specific portion of the individual storage elements 380 on its own may in some cases be critical for the functioning of the distributed storage system. Each of the storage nodes 230 may comprise a share of these storage elements 380.

As will be explained in further detail below, the multi-rack object storage system 180 may be operable as a distributed object storage system to store and retrieve an object data comprising data (e.g. 64 megabytes (MB) of binary data), and object data locality details of the object data, such as an object data identifier for addressing the object data, for example, a universally unique identifier such as a globally unique identifier (GUID). Embodiments of the multi-rack object storage system 180 may operate as a distributed object storage system. Storing the data offered for storage by the application in the form of object data, also referred to as object storage, may have specific advantages over other storage schemes such as suitable block-based storage or file-based storage.

The storage elements 380 or a portion thereof may be redundant and operate independently of one another. This means that if one particular storage element 380 fails its function it can easily be taken on by another storage element 380 in the multi-rack object storage system 180. However, as will be explained in more detail further below, the storage elements 380 are capable of providing redundancy without having to work in synchronism, as is for example the case in many available redundant array of independent disks (RAID) configurations. Furthermore, the independent and redundant operation of the storage elements 380 may allow a suitable mix of types of storage elements 380 to be used in a particular multi-rack object storage system 180. It is possible to use for example storage elements 380 with differing storage capacity, storage elements 380 of differing manufacturers, using different hardware technology such as for example hard disks and solid-state storage elements, using different storage interfaces such as for example different revisions of SATA, parallel advanced technology attachment (PATA), and so on. This may result in advantages relating to scalability and flexibility of the multi-rack object storage system 180 as it allows for adding or removing storage elements 380 without imposing specific requirements to their design in correlation to other storage elements 380 already in use in the distributed object storage system.

Figure 4:
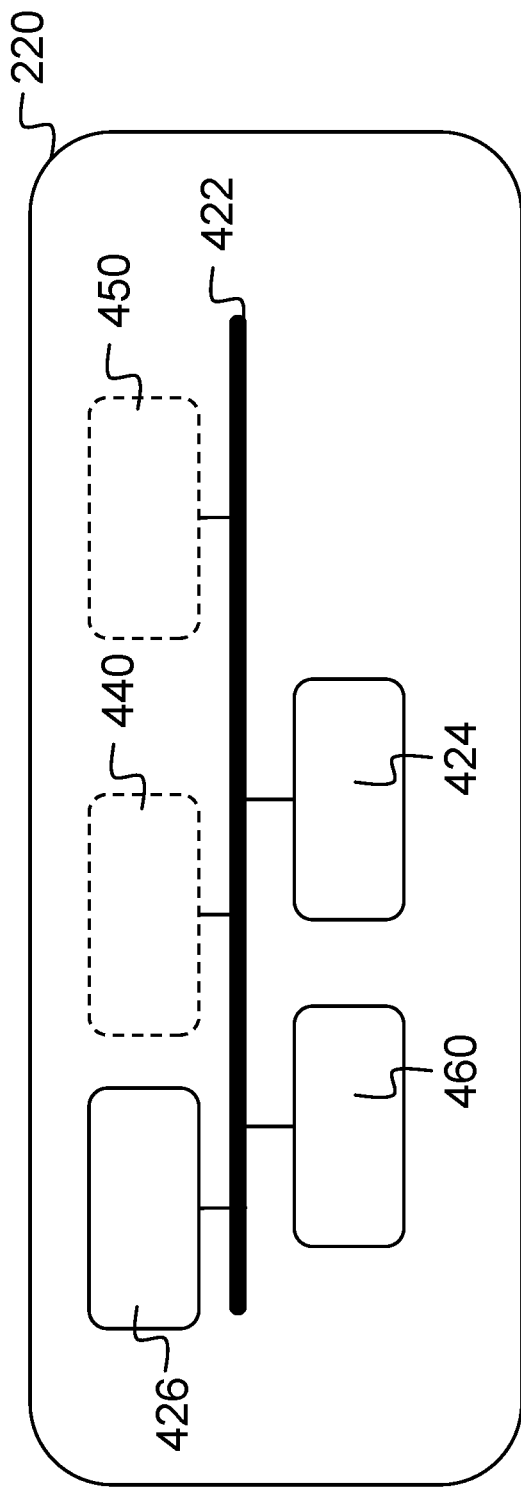
FIG. 4 shows a schematic representation of an embodiment of the access node.

FIG. 4 shows a schematic representation of an embodiment of the access node 220. Access node 220 may include controller node functions, connection relocation functions, and/or file system interface functions for client systems using file system protocols to access data stored in object data in storage nodes 230. Access node 220 may comprise a bus 422, a processor 424, a local memory 426, one or more optional input units 440, one or more optional output units 450. Bus 422 may include one or more conductors that permit communication among the components of access node 220. Processor 424 may include any type of suitable processor or microprocessor that interprets and executes instructions. Local memory 426 may include a random access memory (RAM) or another type of dynamic storage device that stores information and instructions for execution by processor 424 and/or a read only memory (ROM) or another type of static storage device that stores static information and instructions for use by processor 424 and/or any suitable storage element such as a hard disc or a solid state storage element.

An optional input unit 440 may include one or more suitable mechanisms that permit an operator to input information to the access node 220 such as a keyboard, a mouse, a pen, voice recognition and/or biometric mechanisms, etc. Optional output unit 450 may include one or more suitable mechanisms that output information to the operator, such as a display, a printer, a speaker, etc. Communication interface 460 may include any transceiver-like mechanism that enables access node 220 to communicate with other devices and/or systems, for example mechanisms for communicating with other storage nodes 230 or access nodes 220 such as for example two 10 Gb Ethernet interfaces.

According to an alternative embodiment, the access node 220 could have an identical design as a storage node 230, or according to still a further alternative embodiment one of the storage nodes 230 of the distributed object storage system could perform both the function of an access node 220 and a storage node 230. According to still further embodiments, the components of the access node 220 as described in more detail below could be distributed amongst a plurality of access nodes 220 and/or storage nodes 230 in any suitable way. According to still a further embodiment, the clients 160 may run an access node 220. According to still further embodiments, access node 220 may be embodied in separate controller nodes and interface nodes with or without redundancy among the controller nodes and/or interface nodes.

Figure 5:
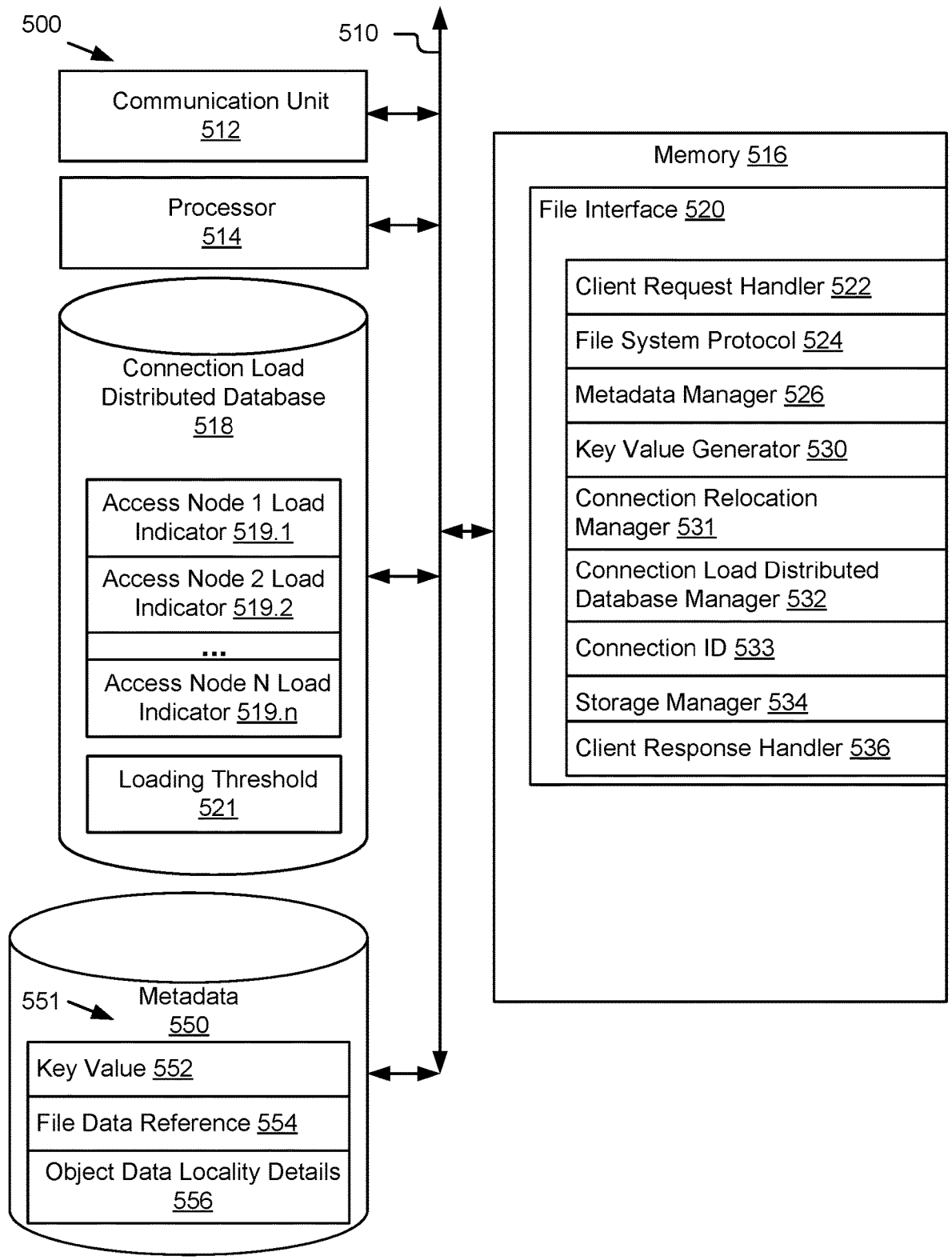
FIG. 5 schematically shows selected modules of an access node with file system interface functions.

FIG. 5 schematically shows selected modules of an access node with connection relocation functions, and file system interface functions. Access node 500 may be configured as a node with an architecture and/or hardware similar to access nodes 220 and/or storage nodes 230. Access node 500 may incorporate elements and configurations similar to those shown in FIGS. 1-4. For example, access node 500 may show selected modules for handling connection reallocations and file data requests using a file system protocol.

Access node 500 may include a bus 510 interconnecting at least one communication unit 512, at least one processor 514, and at least one memory 516. Bus 510 may include one or more conductors that permit communication among the components of access node 500. Communication unit 512 may include any transceiver-like mechanism that enables access node 500 to communicate with other devices and/or systems. For example, communication unit 512 may include wired or wireless mechanisms for communicating with file system clients, other access systems, and/or one or more object storage systems or components, such as storage nodes or controller nodes.

Processor 514 may include any type of processor or microprocessor that interprets and executes instructions. Memory 516 may include a random access memory (RAM) or another type of dynamic storage device that stores information and instructions for execution by processor 514 and/or a read only memory (ROM) or another type of static storage device that stores static information and instructions for use by processor 514 and/or any suitable storage element such as a hard disc or a solid state storage element.

Access node 500 may include or have access to one or more databases, such as a connection load distributed database 518. Connection load distributed database 518 identifies current load indicators 519.1-519.*n* for each of the access nodes in the multi-rack object storage system 180. Connection load distributed database 518 may include a listing of the respective loading of each of the access nodes in the multi-rack object storage system 180. The listing may be ordered to identify the lesser (e.g., least) loaded access node. Accordingly, a received connection request is then relocated to the lesser (e.g., least) loaded access node. The connection load distributed database 518 may further include a loading threshold 521 that, in one embodiment, may be used to identify a threshold above which the access node receiving the connection request will relocate the connection, and below which the access node receiving the connection request will retain the connection as requested. In another embodiment, the loading threshold 521 may be used to identify a loading of an access node above which the access node will not be relocated and a denial of service will be issued. A loading threshold may be static or dynamic and may be set according to set based on various conditions including operational bandwidth, load factors, and other conditions know by those of skill in the art.

The access node 500 may further include a metadata store 550, and one or more data structures for storing, retrieving, indexing, searching, filtering, etc. of structured and/or unstructured data elements. Metadata store 550 may be maintained and managed in separate computing systems with separate communication, processor, memory, and other computing resources and accessed by access node 500 through database access protocols, such as structured query language (SQL). Metadata store 550 may be structured as key-value stores and may be shared across multiple access nodes 500.

Access node 500 may include a plurality of modules or subsystems that are stored and/or instantiated in memory 516 for execution by processor 514. For example, memory 516 may include a file interface module 520 configured to receive, process, and respond to file data requests from file system clients using file system protocols.

File interface module 520 may include a client request handler 522. Client request handler 522 may include an interface and/or communication event-based condition for receiving file data requests from one or more file system clients. For example, client systems may send a file data request over a network connection and addressed to access node 500 or a port or component thereof. Client request handler 522 may receive these requests and parse them according to the appropriate communication and file system protocol (such as defined in file system protocol 524). For example, client request handler 522 may identify a transaction identifier, a client identifier, a file identifier, a data operation, and additional parameters for the data operation, if any, from the received message or messages that make up the file data request.

File interface module 520 includes a connection relocation manager 531. The connection relocation manager 531 may be configured to evaluate the loading of all of the access nodes in the multi-rack object storage system 180, and relocate the connection to the lesser (e.g., least) loaded access node in the multi-rack object storage system 180. Specifically, a client request handler 522 receives a client request over a connection. The connection relocation manager 531 evaluates the loading of the access node by accessing the connection load distributed database 518, which includes a first load indicator designating a first processing load of the first access node receiving the connection request, and at least a second load indicator designating a second processing load of a second access node. The first and second access nodes forming a multi-rack distributed storage system 180 and the distributed database 518 being accessible to the first and second access nodes. When the second processing load is less than the first processing load, then relocating the connection with the client from the first access node to the second access node.

The file interface module 520 further includes a connection load distributed database manager 532. The connection load distributed database manager 532 may be configured to update, for example, the second processing load in the distributed database based on an additional load of the relocated connection moved to the second access node. The connection load distributed database manager 532 is further configured to distribute the update, or make the update available to all of the other access nodes in the multi-rack object storage system 180. As stated, file interface module 520 may be configured to receive file data requests and process the received file data requests to generate one or more storage data requests for processing by an associated distributed storage system, such as object data requests for an object storage system. File interface module 520 may communicate with metadata store 550 to store and retrieve data element, cross-reference metadata to map the file system files of the requesting client to the storage data elements, and/or locations of the distributed storage system.

File interface module 520 may include a file system protocol 524, a metadata manager 526, a key value generator 530, a connection relocation manager 531, a connection ID 533, a storage manager 534, and a client response handler 536. File interface module 520 may include additional modules (not shown) for other data access features, such as data caching, request prioritization, etc.

File system protocol 524 may include configuration settings, functions, modules, application protocol interfaces (APIs), extensions, or other elements to support a selected file system protocol. For example, file interface 520 may be configured to support a specific set of client systems that use a selected file system protocol, such as NFS, SMB, FAT, HDFS, GFS, etc. protocol. File interface 520 may support a single file system protocol or select a protocol from a set of available protocols. In some embodiments, the other modules of file interface 520 may utilize the configuration settings or other functions of file system protocol 524 to support receiving, parsing, processing, and responding to file data requests in the selected file system protocol.

Metadata manager 526 may include an interface protocol or set of functions and parameters for storing, reading, and otherwise managing metadata, including object data locality details of the object data and other data related to data files and storage data elements. For example, metadata manager 526 may include functions for storing, searching, and reading data file to storage element mapping information to and from metadata store 550. Metadata store 550 may be configured as a key-value store. For example, each data file may have at least one corresponding entry in metadata store 550 with a unique key value 552 and a cross-reference of file data references or identifiers to storage data references or identifiers.

Each key value 552 may index a number of corresponding fields, such as file data reference 554 and object data locality details 556. File data reference 554 may provide a file data identifier, such as node and file name, and/or parameters for generating a file data identifier corresponding to a client data file identified in a file data request in accordance with file system protocol 524. File data reference 554 may include additional file data related metadata used for managing file data requests.

Object data locality details 556 may provide an object data identifier, such as a global unique identifier (GUID), and/or parameters for generating an object data identifier corresponding to client data stored in object data in an associated object storage system and corresponding to the client data file associated with the key entry. Other storage data references may include logical and/or physical mapping for the distributed storage system, such as logical block addresses, file identifiers for a different file-based storage system, etc. In some embodiments, key value 552 may be derived from file data reference 554 and/or object data locality details 556.

The metadata manager 526 may also utilize a key value generator 530 for new mapping entries in metadata store 550 and, in some embodiments, key value generator 530 may be configured to generate both mapping entry key values and request entry key values, among others. Key value generator 530 may include logic for generating key values that improve indexing and/or reduce the number of fields to represent request entries. Key value generator 530 may parse the file data request or receive fields or parameters parsed by client request handler 522 for use in generating key value 552. For example, client reference parameters, transaction identifiers, transaction types or parameters, and/or file data references may contribute to the generation of a unique key value 552 for a particular file data request.

The connection relocation manager 531 addresses the problem of disparate loading of the access nodes. As stated, the client does not have insight as to the respective loading of the access nodes. Accordingly, the client may establish a connection with an access node that is overloaded resulting in the request being dropped and the service being denied. In some embodiments, the connection relocation manager 531 relocates the client request connection end point to an access node that is lesser (e.g., least) loaded. Client request may utilize a hypertext transfer protocol/transmission control protocol (HTTP/TCP) connection, which is not easy to relocate to a different server. In some embodiments, a connection-oriented protocol is used which is designed with connection end point relocation capability.

In some embodiments, the connection-oriented protocol may include a protocol where connections are identified using, for example, a 64-bit connection ID. If the client's or server's IP address changes in connection-oriented protocol, the connection may be maintained by using the old connection ID used at the new IP address without necessitating any requests.

One example of the connection-oriented protocol includes the QUIC protocol established by Google, Inc.™ QUIC protocol is a multiplexed and secure transport layer built atop user datagram protocol (UDP), and is designed and optimized for HTTP/2 semantics. QUIC provides multiplexing and flow control equivalent to HTTP/2, security equivalent to transport layer security (TLS), and connection semantics, reliability, and congestion control equivalent to TCP. While TCP connections are identified by a 4-tuple of source address, destination address and its ports, which mean that if a client's or server's IP address changes, any active TCP connections are no longer valid, QUIC connections are identified using, for example, a 64-bit connection ID 533. If the client's or server's IP address changes in QUIC connection, it can continue to use the old connection ID from the new IP address without any requests.

Storage manager 534 may include an interface protocol or set of functions and parameters for storing, reading, and otherwise managing data requests to an associated distributed storage system. For example, storage manager 534 may include functions for reading, writing, modifying, or otherwise manipulating object data and their respective client data and metadata in accordance with the protocols of an object storage system. Storage manager 534 may generate data requests translated and mapped from file data references to storage data references using metadata store 550. File interface 520 may include additional logic and other resources (not shown) for processing file data requests, such as modules for generating, caching, queueing, and otherwise managing data requests. Processing of a file data request by file interface 520 may include any number of intermediate steps that yield at least one data request to the distributed storage system from storage manager 534, such as an object data request to an object storage system.

Client response handler 536 may include an interface and/or communication logic for sending response messages, such as a result, a status, or error messages, to one or more file system clients related to file data requests received. For example, client response handler 536 may wait for processing to complete or generate an error and provide an appropriate result or error message to the client system(s) for each file data request received.

Figure 6:
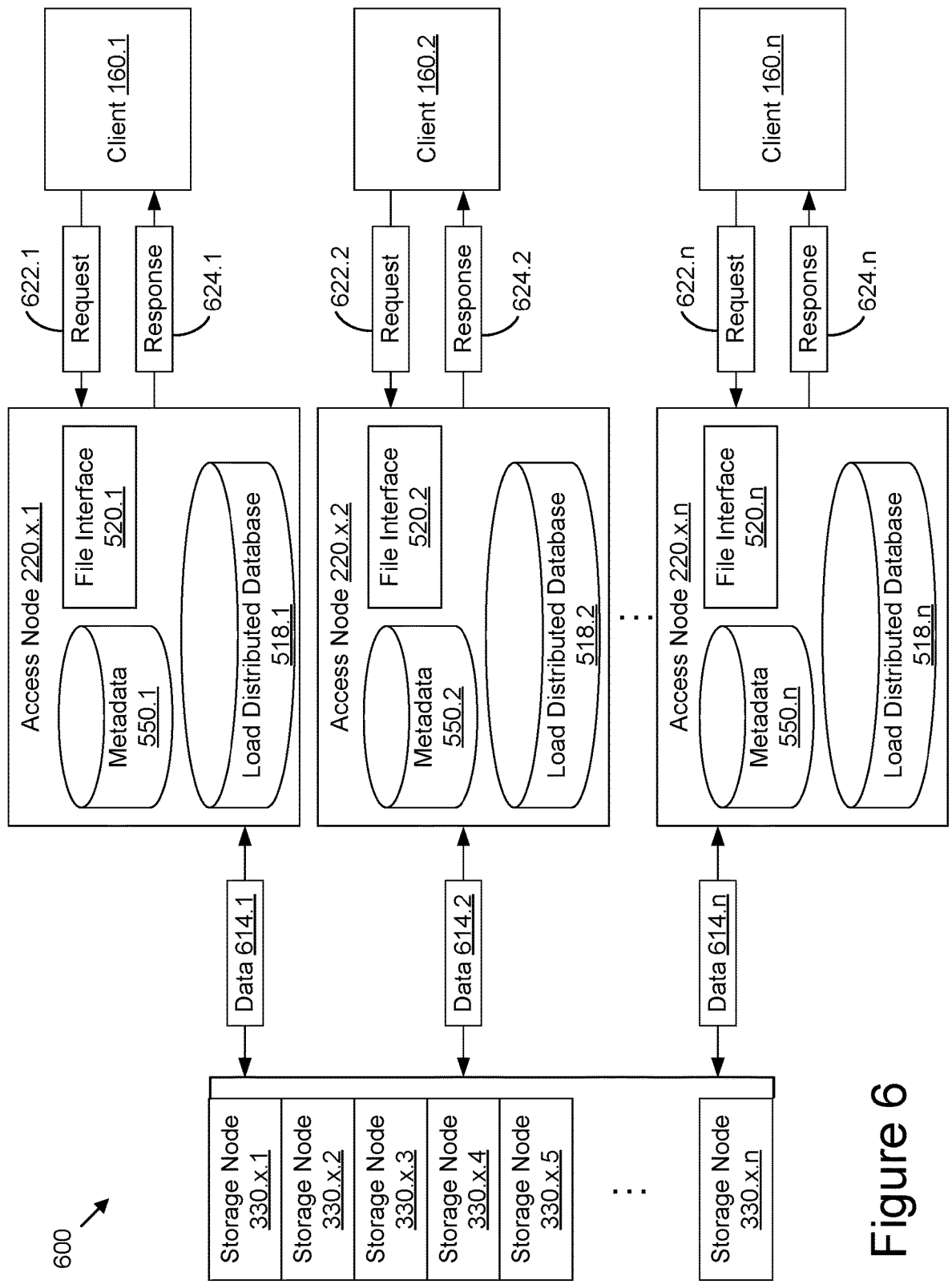
FIG. 6 shows a distributed object data storage system capable of connection relocation.

FIG. 6 shows a distributed object data storage system 600 capable of connection relocation (e.g., migration), as further described below. In some embodiments, distributed object data storage system 600 may be configured according to the systems and elements described with regard to FIGS. 1-5. Distributed object data storage system 600 may include a plurality of storage nodes 230.$x$.1-230.$x$.n for receiving and processing storage data requests 614.1-614.$n$. A plurality of access nodes 220.$x$.1-220.$x$.n may receive file data requests 622.1-622.$n$ from and provide responses 624.1-624.$n$ to clients 160.1-160.$n$.

Clients 160 may include computing systems using file system protocols to access and store file data. For example, individual computing systems, application servers, legacy enterprise network systems, and other systems may be configured with NFS protocols for data storage and retrieval. Clients 160 may host or interface with one or more applications that generate file data requests 622, such as read, write, create, delete, move, etc. requests or commands for manipulating data files through data operations. File data requests 622 may include a transaction identifier, a client identifier, a file data identifier, a data operation, and additional parameters for the data operation, if any. Clients 160 may expect to receive responses 624 corresponding to requests 622.

Access nodes 220 may include file interfaces 520.1-520.$n$, connection load distributed databases 518.1-518.$n$, and metadata stores 550.1-550.$n$. File interfaces 520 may include file interface systems and modules for receiving requests 622, checking for object data locality, generating object data requests 614 to storage nodes 610 for requests using metadata stores 550 when the object data is local and sending a request to and receiving a response from a remote rack where the metadata for the requested object data is located, and generating responses 624 to clients 160. The file interface 520 may be further configured to contact an access node in the remote rack to inform the remote rack of a forthcoming connection relocation (e.g., migration). The file interface 520 may be further configured to send the connection identifier (ID) along with connection details to the remote system node for relocating the connection end point. When the access node 220 is the remote rack, the file interface 520 may be further configured to handshake with the client 160 with the connection ID along with the revised (e.g., remote) destination details.

While access node 220 and file system clients 160 are shown in a one-to-one correlation with communication from, for example, client 160.1 to access node 220.$x$.1. Alternate configurations may include different numbers and communication paths with regard to access systems and client systems. For example, a single access system may handle file data requests from a plurality of file system clients or a single file system client may send different file data requests to a plurality of access systems.

The connection load distributed databases 518.1-518.$n$ may each be substantially similar and are each updated in response to a relocation of connection with a client. As stated, a client may arbitrarily establish a connection and issue a request to an access node without regard to any loading conditions the access node may be experiencing. The access node, upon receipt of the request over a connection, may be unable to service the request due to an existing connection load. Further, the access node may be unfairly requested to support a connection and service a request when other access nodes may be supporting a smaller load. Accordingly, the embodiments provide a solution to minimizing dropped requests by relocating a request including a connection to a lesser or least loaded access node, based on current load levels for each of the access nodes as maintained and updated in the connection load distributed database 518.*x*.

Further, in some configurations, a plurality of access nodes 220 are configured with a plurality of clients 160 such that file data requests may be sent from and handled by any system for redundancy and/or requests may be dynamically load balanced across the available access systems and/or file system clients. In some embodiments, these configurations may include failover and retry of transactions across multiple clients 160 and/or access nodes 220. Access nodes 220 may be configured such that metadata stores 550 are distributed and/or accessible through remote queries from file interfaces 520 of other access systems to allow connection relocation (e.g., migration) from one access node to a remote access node regardless of client.

Figure 7:
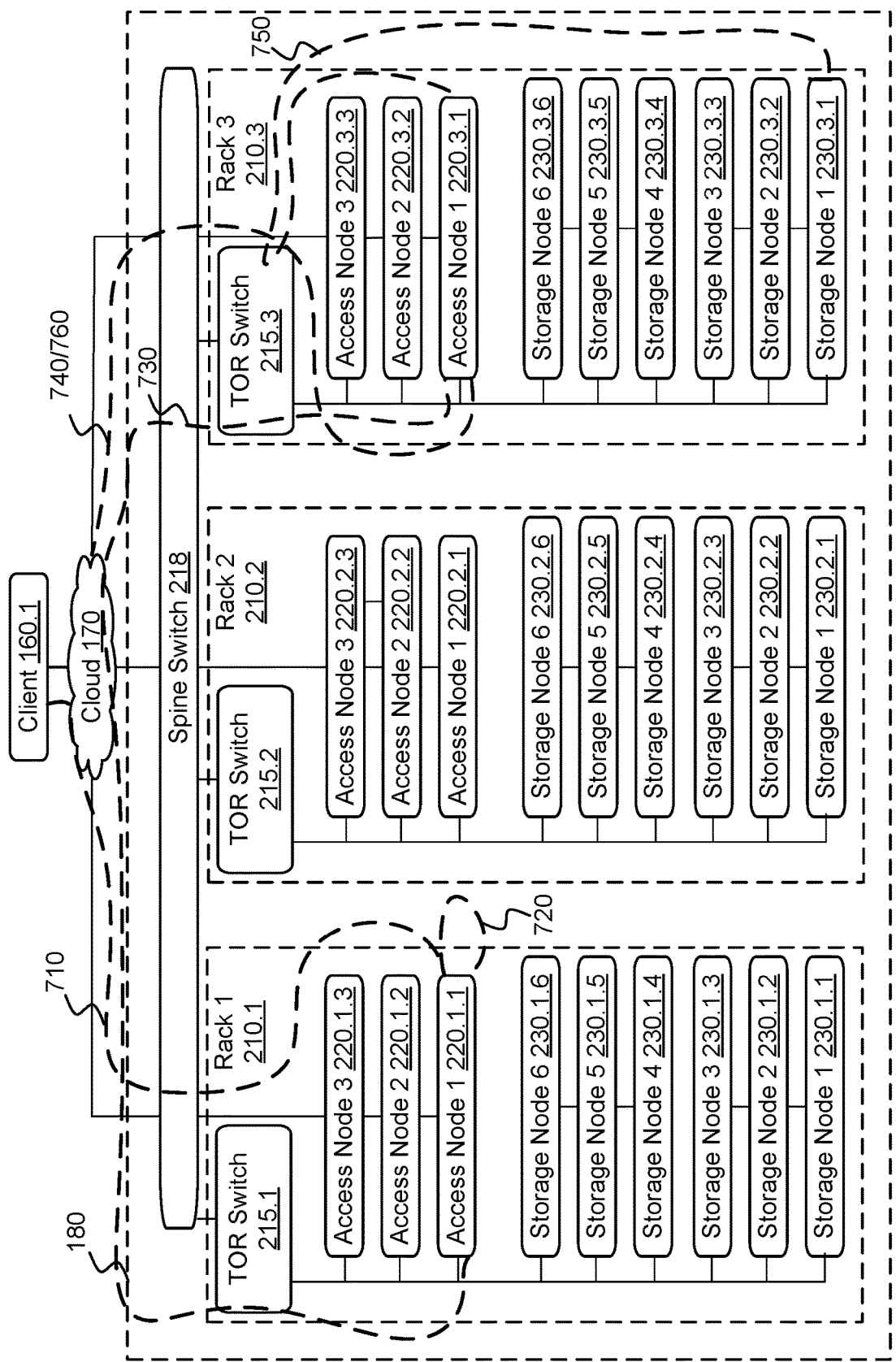
FIG. 7 illustrates a flow diagram of a client request to a multi-rack distributed object storage system.

FIG. 7 illustrates a flow diagram of a client request to a multi-rack distributed object storage system. As stated above with respect to FIG. 2, the multi-rack object storage system 180 includes a plurality of interconnected racks 210, illustrated to include three racks 210.1-210.3. The multiple racks 210 are interconnected in a lateral or "east-west" arrangement using a switch illustrated as spine switch 218 for inter-rack communication between the top-of-rack (TOR) switches 215 of each rack 210.

In operation, any access node may receive a request over a connection with a client to read (GET) or write (PUT) object data to the multi-rack distributed storage system. The connection is identified by a unique connection ID. The request is illustrated as request 710 and is received, for example, at access node 220.1.1. In some prior approaches, the access node receiving the request would either service the request or drop the request if the connection load being serviced by the access node exceeded the processing capacity of the access node.

In various embodiment, the access node 220.1.1, prior to servicing the request, consults the connection load distributed database 518 and identifies 720 the lesser (e.g., least) loaded access node in the system, which, by way of example, is illustrated as access node 220.31. The access node 220.1.1 communicates 730 the request and the connection ID to the access node 220.3.1.

The access node 220.3.1 uses the connection ID to handshake 740 with the client 160.1. In the handshake, the access node 220.3.1 sends a request to the client 160.1 that includes the destination IP address and port of the access node 220.3.1. The client validates the newly received destination IP address and updates the connection information associated with the connection ID. Thereafter, any interactions over the connection identified by the connection ID are between the client 160.1 and the access node 220.3.1 which, due to a lesser loading, is better capable of completing a request without dropping the request.

As noted, the original request from the client to the access node 220.1.1 was also passed to access node 220.3.1 which then processes 750 the request by, for example, reading (GET) or writing (PUT) object data with, for example, a storage node 230.3.1. The respective retrieved object data or confirmation or storage of the object data is then returned 760 in a response from the access node 220.3.1 to the client 160.1.

To facilitate connection relocation, a connection-oriented protocol may be employed. One example of a connection-oriented protocol includes the QUIC protocol. QUIC is a transport layer network protocol with the definition of the standard available at QUIC: A UDP-Based Multiplexed and Secure Transport Draft-IETF-QUIC-Transport-08, a copy of which may be available at ietf.org.

Generally, QUIC is a multiplexed and secure transport layer built atop UDP, and is designed and optimized for HTTP/2 semantics. QUIC provides multiplexing and flow control equivalent to HTTP/2, security equivalent to transport layer security (TLS), and connection semantics, reliability, and congestion control equivalent to TCP. Typically, TCP connections may be identified by a 4-tuple of source address, destination address and its ports. Accordingly using TCP, if a client's or server's IP address changes, then any active TCP connections are no longer valid. However, QUIC connections may be identified using, for example, a 64-bit connection ID. If the client's or server's IP address changes in a QUIC connection, the connection can continue to use the original connection ID for the new IP address without any requests.

The connection end point may be relocated to the access node 220.3.1 located in remote rack 210.3, since unlike a TCP connection, a connection based on a connection-oriented protocol, and example of which may be the QUIC transport protocol, is identified with a unique connection ID instead of the 4-tuples (source IP address, source port, destination IP address, destination port) of TCP.

Figure 8:
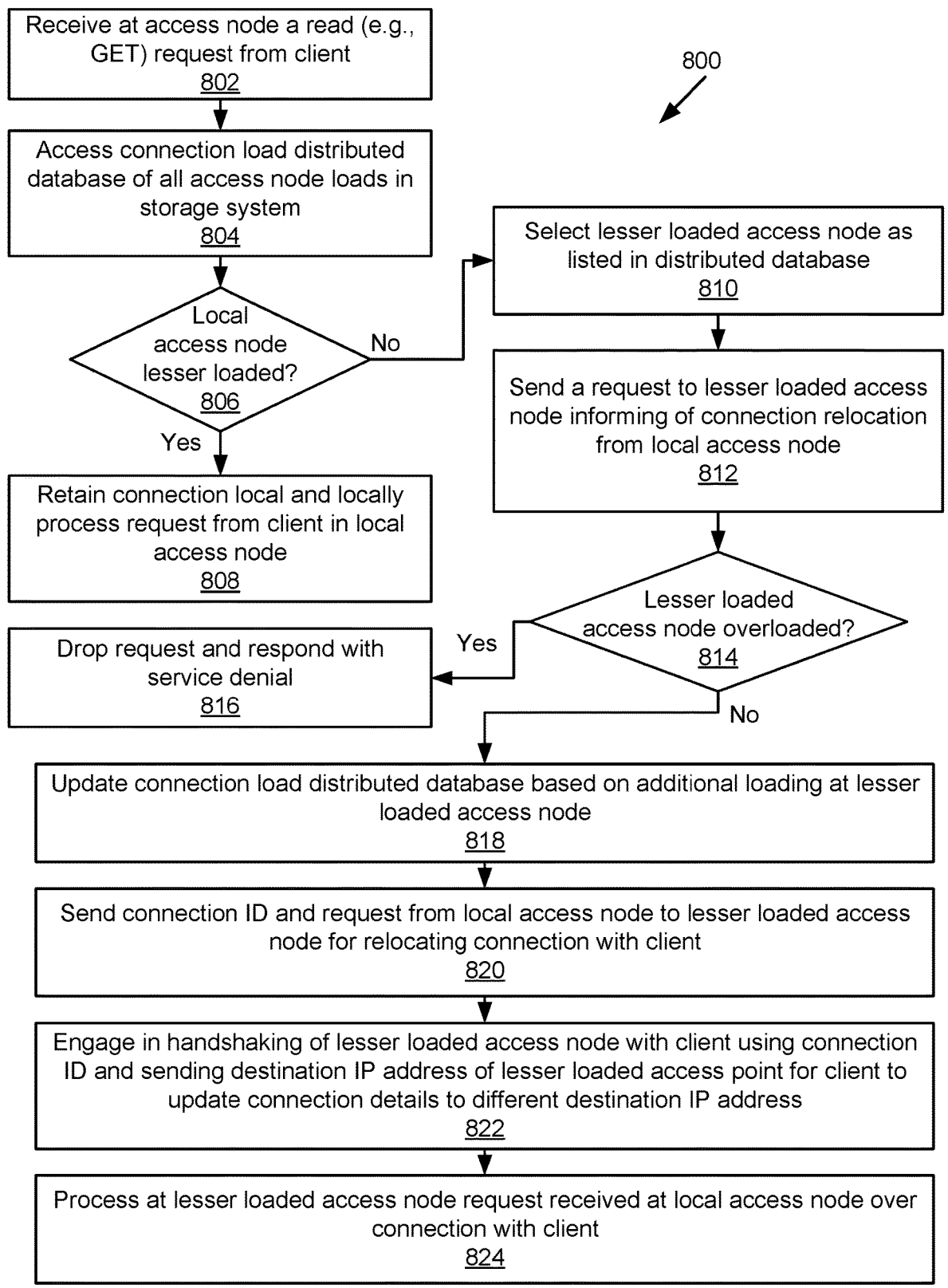
FIG. 8 illustrates a flow diagram for relocating a connection for a read request (e.g., "GET") in a multi-rack object storage system.

FIG. 8 illustrates a flow diagram for relocating a connection for a read request (e.g., "GET") in a multi-rack object storage system, in accordance with embodiments. The multi-rack object storage system 180 may be operated according to a connection relocation (e.g., migration) method 800 illustrated by blocks 802-924 of FIG. 8. The client and the access nodes may be operated according to a connection-oriented protocol.

In block 802, a client-issued request to engage in a connection with a client, one example of which may be a read (e.g., GET) request, may be received by an access node (e.g., local access node) at a file interface. For example, a first request (flow 710 of FIG. 7) from a client for object data may be received over a connection between a client and a first access node in distributed storage system. The first request is related to an object data, and the connection with the client is uniquely identified by a connection ID independent of source and destination addresses and ports.

In block 804, the first access node accesses a connection load distributed database. The connection load distributed data base includes a load indicator (e.g., load factor) for each of at least a portion of access nodes in the distributed storage system. The loading, identified by a load indicator, may be based on a variety or combination of conditions, including a quantity of active connections with each access node, bandwidth demands present at each access node, capabilities of each access node, historical conditions at each of the access nodes, etc.

In query block 806, a decision is made to determine if the request can be processed locally without relocating the connection. If the first (local) access node is the lesser (e.g., least) loaded access node listed in the connection load distributed database, then the first request in block 808 is processed locally without any connection relocation. Alternative embodiments may include processing the request locally if the loading of the first (local) access node is below a threshold, such as threshold 521 of FIG. 5.

If the first (local) access node is not the lesser (e.g., least) loaded access node listed in the connection load distributed database, then another access node, such as the lesser (e.g., least) loaded access node listed in the connection load distributed database is selected as the relocation (remote) access node to which the connection will be relocated.

In block 812, a second request is sent to the selected lesser (e.g., least) loaded (remote) access node identifying to the lesser (e.g., least) loaded access node that a connection is going to be relocated to the lesser (e.g., least) loaded access node.

In query block 814, a decision is made to determine if the relocation of the connection to the lesser (e.g., least) loaded access node will cause the lesser (e.g., least) loaded access node to be overloaded and incapable of processing the request from the client. If the query determines the relocation of the connection would cause the lesser (e.g., least) loaded access node to become overloaded, then processing passes to a block 816 where the first request is dropped and the client is informed of service denial.

If the query block 814 determines that the identified lesser (e.g., least) loaded access node will not become overloaded with the addition of the relocation of the connection from the first (local) access node, then processing continues in blocks 818-824 to relocate the connection.

In block 818, the connection load distributed database is updated to reflect the additional load of the connection within the lesser (e.g., least) loaded (remote) access node. The database may be distributed or updated or made available to each of the access nodes listed in the connection load distributed database.

In block 820, the first (local) access node sends a request to the lesser (e.g., least) loaded (remote) access node. The request includes the connection ID and the first request as received at the first (local) access node over the connection from the client.

In block 822, the lesser (e.g., least) loaded (remote) access node engages in handshaking with the client by sending a request using the connection ID and also sending to the client the destination IP address of the lesser (e.g., least) loaded (remote) access node.

In block 824, the lesser (e.g., least) loaded (remote) access node process the first request as received at the first access (local) access node over the connection. As illustrate with respect to block 802, the first request was for an interaction with the storage node, which in the example of FIG. 8, is for a read (e.g., GET) operation.

Figure 9:
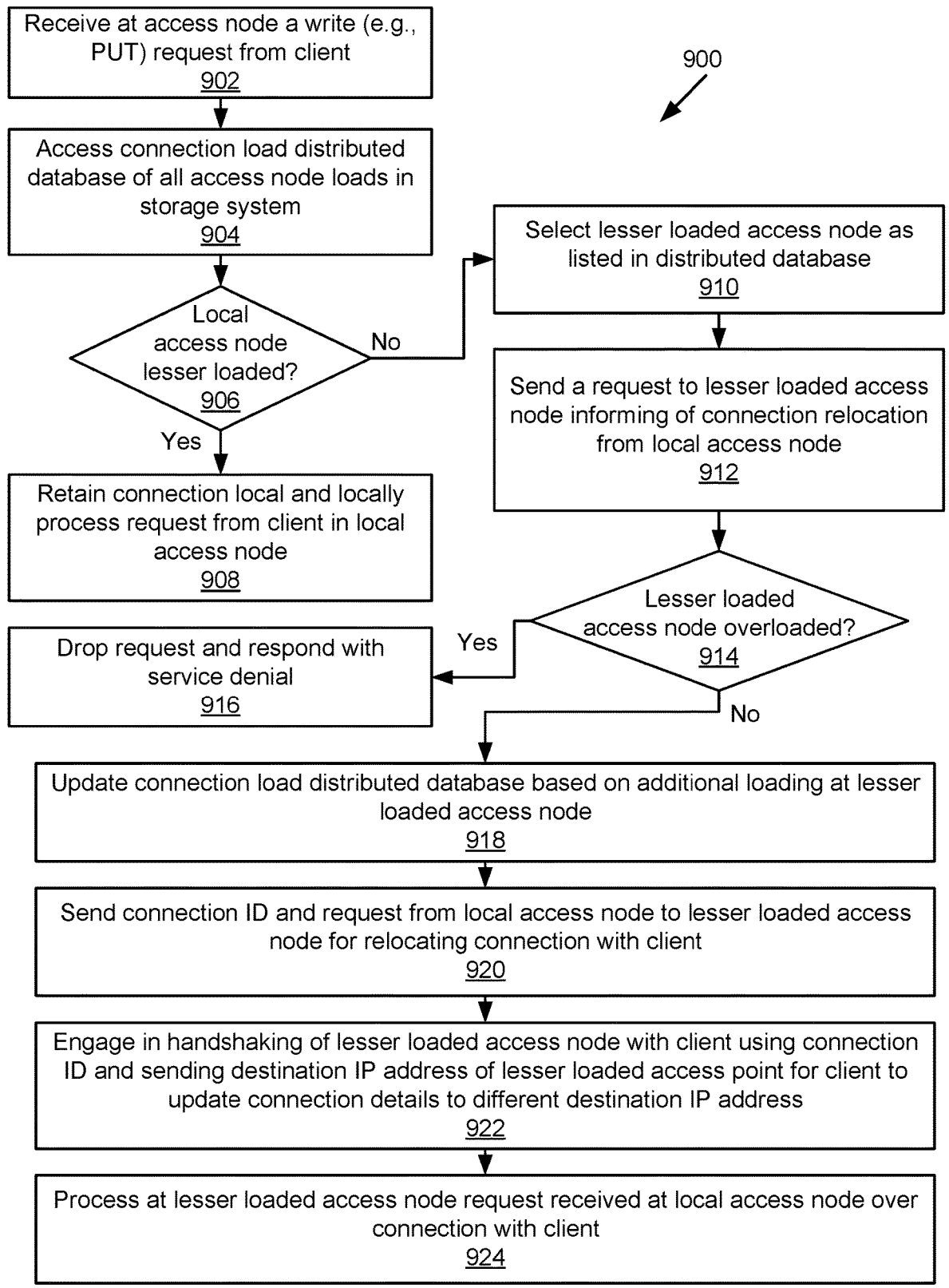
FIG. 9 illustrates a flow diagram for relocating a connection for a write request (e.g., "PUT") in a multi-rack object storage system.

FIG. 9 illustrates a flow diagram for relocating a connection for a write request (e.g., "PUT") in a multi-rack object storage system, in accordance with embodiments. The multi-rack object storage system 180 may be operated according to a connection relocation (e.g., migration) method 900 illustrated by blocks 902-924 of FIG. 9. The client and the access nodes may be operated according to a connection-oriented protocol.

In block 902, a client-issued request to engage in a connection with a client, one example of which may be a write (e.g., PUT) request, may be received by an access node (e.g., local access node) at a file interface. For example, a first request (flow 710 of FIG. 7) from a client for object data may be received over a connection between a client and a first access node in distributed storage system. The first request is related to an object data, and the connection with the client is uniquely identified by a connection ID independent of source and destination addresses and ports.

In block 904, the first access node accesses a connection load distributed database. The connection load distributed data base includes a load indicator (e.g., load factor) for each of at least a portion of access nodes in the distributed storage system. The loading, identified by a load indicator, may be based on a variety or combination of conditions, including a quantity of active connections with each access node, bandwidth demands present at each access node, capabilities of each access node, historical conditions at each of the access nodes, etc.

In query block 906, a decision is made to determine if the request can be processed locally without relocating the connection. If the first (local) access node is the lesser (e.g., least) loaded access node listed in the connection load distributed database, then the first request in block 908 is processed locally without any connection relocation. Alternative embodiments may include processing the request locally if the loading of the first (local) access node is below a threshold, such as threshold 521 of FIG. 5.

If the first (local) access node is not the lesser (e.g., least) loaded access node listed in the connection load distributed database, then another access node, such as the lesser (e.g., least) loaded access node listed in the connection load distributed database is selected as the relocation (remote) access node to which the connection will be relocated.

In block 912, a second request is sent to the selected lesser (e.g., least) loaded (remote) access node identifying to the lesser (e.g., least) loaded access node that a connection is going to be relocated to the lesser (e.g., least) loaded access node.

In query block 914, a decision is made to determine if the relocation of the connection to the lesser (e.g., least) loaded access node will cause the lesser (e.g., least) loaded access node to be overloaded and incapable of processing the request from the client. If the query determines the relocation of the connection would cause the lesser (e.g., least) loaded access node to become overloaded, then processing passes to a block 916 where the first request is dropped and the client is informed of service denial.

If the query block 914 determines that the identified lesser (e.g., least) loaded access node will not become overloaded with the addition of the relocation of the connection from the first (local) access node, then processing continues in blocks 918-924 to relocate the connection.

In block 918, the connection load distributed database is updated to reflect the additional load of the connection within the lesser (e.g., least) loaded (remote) access node. The database may be distributed or updated or made available to each of the access nodes listed in the connection load distributed database.

In block 920, the first (local) access node sends a request to the lesser (e.g., least) loaded (remote) access node. The request includes the connection ID and the first request as received at the first (local) access node over the connection from the client.

In block 922, the lesser (e.g., least) loaded (remote) access node engages in handshaking with the client by sending a request using the connection ID and also sending to the client the destination IP address of the lesser (e.g., least) loaded (remote) access node.

In block 924, the lesser (e.g., least) loaded (remote) access node process the first request as received at the first access (local) access node over the connection. As illustrate with respect to block 902, the first request was for an interaction with the storage node, which in the example of FIG. 9, is for a write (e.g., PUT) operation.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of a hardware embodiment, a software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any suitable language.

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general-purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A system comprising:
    a first access node including a first connection relocation manager in a first rack;
    a second access node including a second connection relocation manager in a second rack, wherein the first rack and the second rack form a multi-rack distributed storage system; and
    a connection load distributed database that is accessible to the first access node and to the second access node, wherein the connection load distributed database is configured to store:
        a first load indicator designating a first processing load of the first access node; and
        a second load indicator designating a second processing load of the second access node;
    wherein the first access node is configured to:
        receive a data request over a connection with a client, wherein the connection with the client is identified by a connection identifier (ID) that is independent of a source Internet Protocol (IP) address and a destination IP address of the first access node and a source IP address and a destination IP address of the client; and
determine, based on the first processing load, that the first access node is unable to service the data request;
wherein the first connection relocation manager is configured to:
in response to the first action node being unable to service the data request and the second processing load being less than the first processing load:
send the connection ID to the second access node; and
relocate the connection with the client from the first access node to the second access node; and
wherein the second connection relocation manager in the second access node is configured to:
send a connection relocation request using the connection ID to the client, wherein the connection relocation request includes a destination address of the second access node; and
maintain the connection with the client.

2. The system of claim 1, wherein the second access node is further configured to update the second processing load in the connection load distributed database based on an additional load of the connection.

3. The system of claim 1, further comprising a storage node in the second rack, wherein:
the second access node is further configured to process the data request received at the first access node from the client over the connection; and
the data request is for an interaction with the storage node.

4. The system of claim 3, wherein:
the second access node is further configured to send a response to the client over the connection between the second access node and the client; and
the response is based on the data request from the client received over the connection between the first access node and the client.

5. The system of claim 1, wherein the second rack is remotely located from the first rack.

6. The system of claim 1, wherein the first connection relocation manager is further configured to relocate the connection responsive to the first processing load exceeding a loading threshold and the second processing load being less than the first processing load.

7. The system of claim 1, wherein the first connection relocation manager is further configured to send details of a type of the connection to the second access node.

8. The system of claim 1, wherein the connection is based on a Quick User datagram protocol (UDP) Internet Connection (QUIC) protocol.

9. A computer-implemented method, comprising:
receiving a data request at a first access node in a first rack from a client over a connection, wherein the connection with the client is identified by a connection identifier (ID) that is independent of a source Internet Protocol (IP) address and a destination IP address of the first access node and a source IP address and a destination IP address of the client;
accessing, by the first access node, a connection load distributed database including a first load indicator designating a first processing load of the first access node and a second load indicator designating a second processing load of a second access node, wherein the first access node and the second access node form a multi-rack distributed storage system and the connection load distributed database is accessible to the first access node and the second access node;
determining, based on the first processing load at the first access node, that the first access node is unable to service the data request; and
in response to determining that the first access node is unable to service the data request and the second processing load being less than the first processing load:
sending the connection ID from the first access node to the second access node;
sending a connection relocation request from the second access node using the connection ID to the client, wherein the connection relocation request includes a destination address of the second access node;
relocating the connection with the client from the first access node to the second access node; and
maintaining the connection with the client.

10. The computer-implemented method of claim 9, further comprising updating the second processing load in the connection load distributed database based on an additional load of the connection.

11. The computer-implemented method of claim 9, further comprising processing, by the second access node, the data request received at the first access node from the client over the connection, wherein the data request is for an interaction with a storage node in the multi-rack distributed storage system.

12. The computer-implemented method of claim 11, further comprising sending a response to the client over the connection between the second access node and the client, wherein the response is based on the data request from the client received over the connection between the first access node and the client.

13. The computer-implemented method of claim 9, further comprising relocating the connection responsive to the first processing load exceeding a loading threshold and the second processing load being less than the first processing load.

14. The computer-implemented method of claim 9, further comprising sending details of a type of the connection to the second access node.

15. The computer-implemented method of claim 9, wherein the connection is based on a Quick User datagram protocol (UDP) Internet Connection (QUIC) protocol.

16. A system, comprising:
means for receiving a data request at a first access node in a first rack from a client over a connection, wherein the connection with the client is identified by a connection identifier (ID) that is independent of a source Internet Protocol (IP) address and a destination IP address of the first access node and a source IP address and a destination IP address of the client;
means for accessing, by the first access node, a connection load distributed database including a first load indicator designating a first processing load of the first access node and a second load indicator designating a second processing load of a second access node, wherein the first access node and the second access node form a multi-rack distributed storage system and the connection load distributed database is accessible to the first access node and the second access node;
means for determining, based on the first processing load at the first access node, that the first access node is unable to service the data request; and in response to determining that the first access node is unable to service the data request and the second processing load being less than the first processing load:
    means for sending the connection ID from the first access node to the second access node;
    means for sending a connection relocation request from the second access node using the connection ID to the client, wherein the connection relocation request includes a destination address of the second access node;
    means for relocating the connection with the client from the first access node to the second access node; and
    means for maintaining the connection with the client.

* * * * *